Oct. 14, 1924.                                                          1,511,810
                            W. A. GWYNN
                             VULCANIZER
                        Filed Nov. 5, 1920                    2 Sheets-Sheet 1
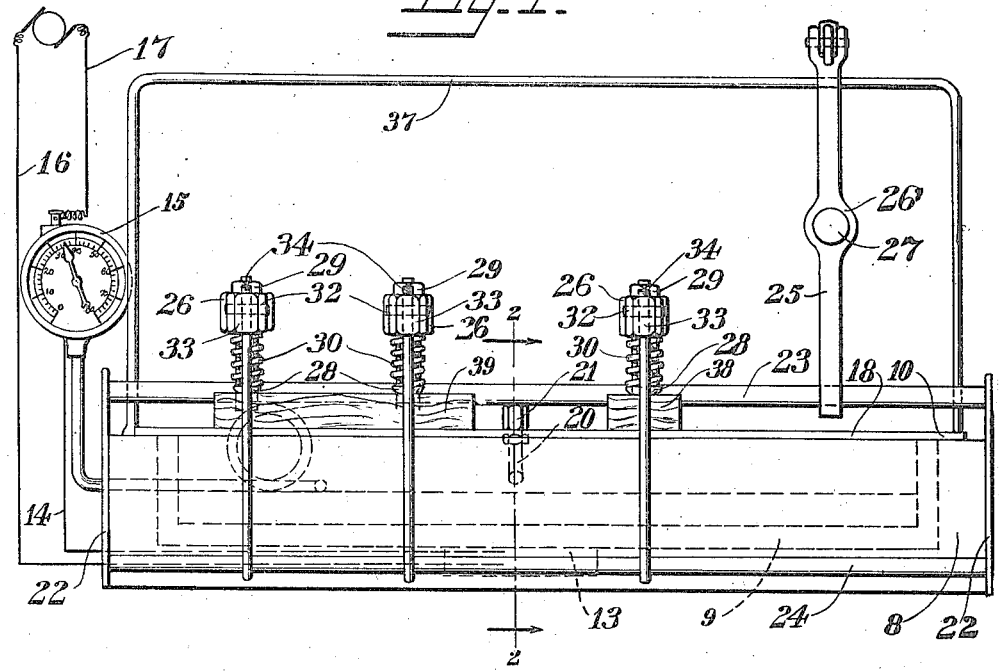
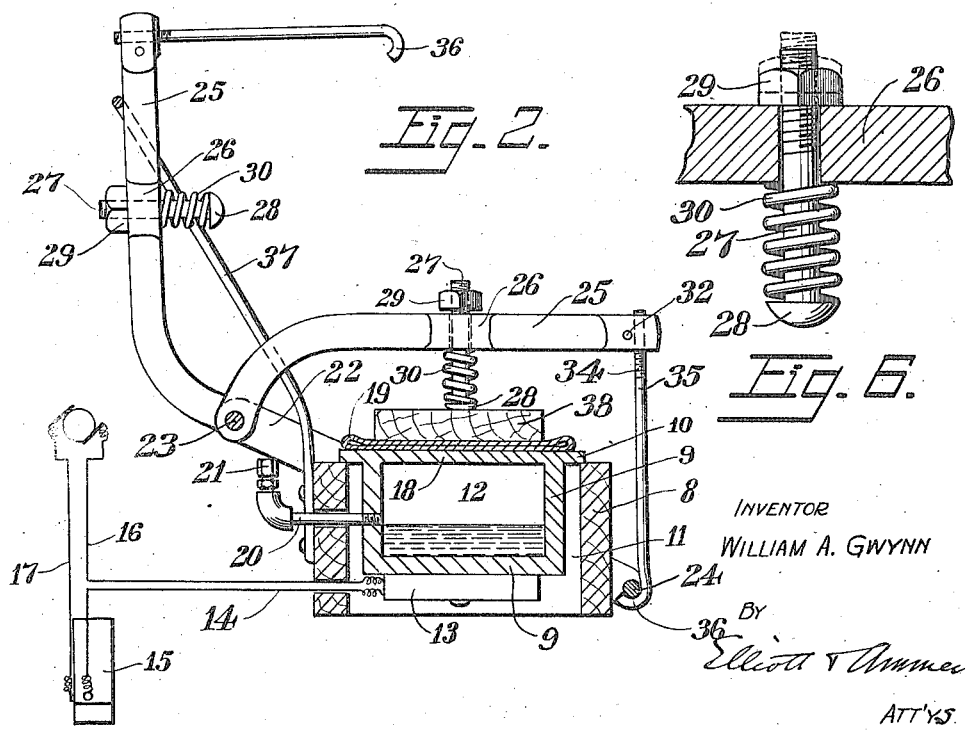
INVENTOR
WILLIAM A. GWYNN
By
Elliott & Ammen
ATT'YS.

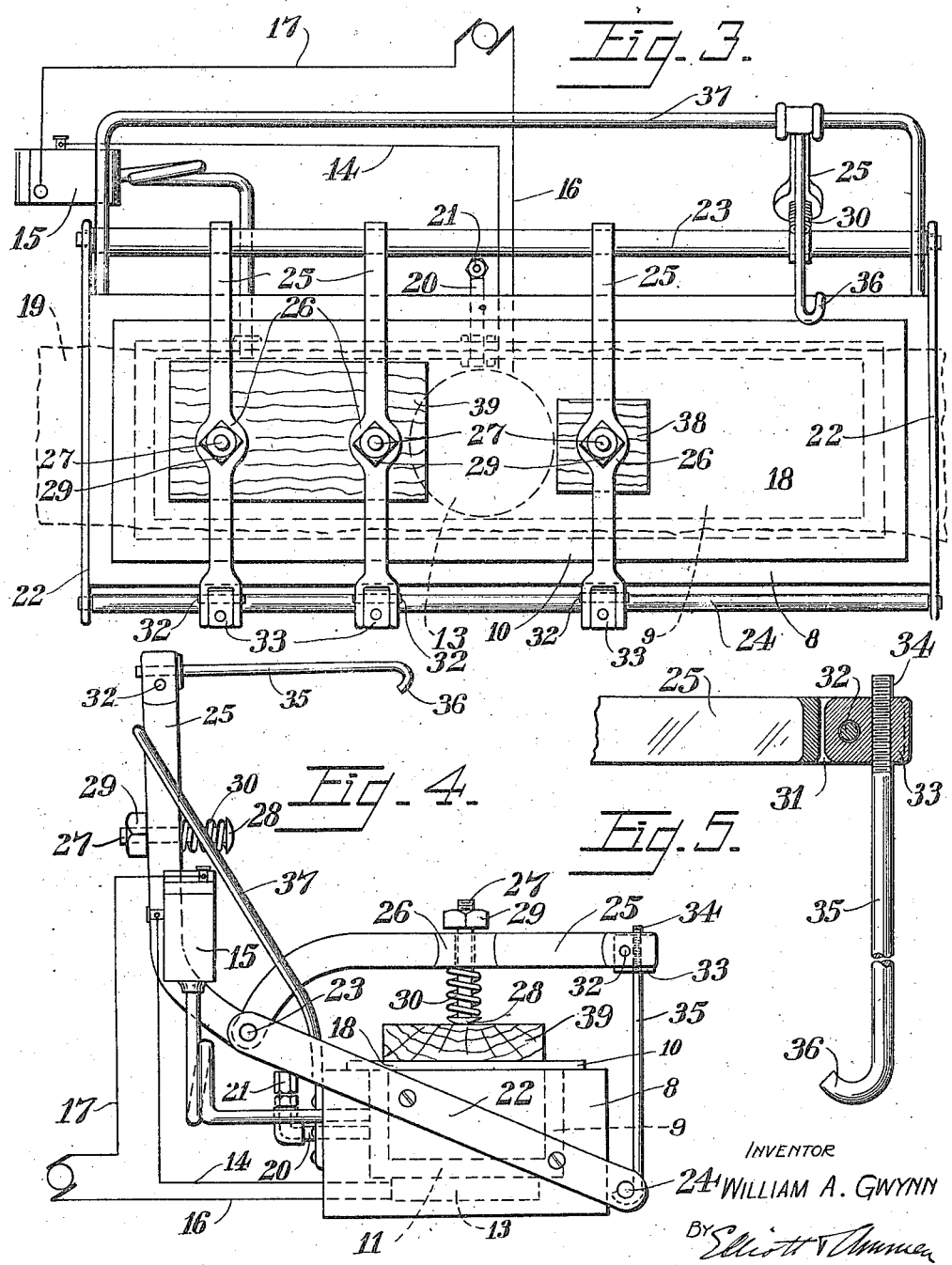

Patented Oct. 14, 1924.

1,511,810

UNITED STATES PATENT OFFICE.

WILLIAM A. GWYNN, OF ST. LOUIS, MISSOURI, ASSIGNOR TO SUSIE E. GWYNN, OF ST. LOUIS, MISSOURI.

VULCANIZER.

Application filed November 5, 1920. Serial No. 421,816.

*To all whom it may concern:*

Be it known that I, WILLIAM A. GWYNN, a citizen of the United States, residing in the city of St. Louis and State of Missouri, have invented new and useful Improvements in Vulcanizers, of which the following is a specification.

This invention relates to vulcanizing machines of the type intended more particularly for use in repair work in connection with securing patches on tubes for pneumatic tires to close punctures therein.

More particularly my invention is designed for use in connection with vulcanizing machines of the type embodying electric means for heating a body of water in a hollow vulcanizing body on which the tube to be mended is adapted to be clamped.

In this type of machine the metal clamping members and other metal parts have been connected directly to the vulcanizing body and as a result, offer ready means for radiating the heat generated in the vulcanizer, so that there is much waste of electric energy and the operation of the machine is thereby made more costly than is necessary.

It is the main object of the present invention to provide a machine in which the device for clamping the tube against the surfaces of the vulcanizing body and other metal parts of the machine are supported in insulated relation to the vulcanizing body so as to prevent them from acting as conductors or radiators for the heat generated in the vulcanizer.

It is a further object of the invention to provide novel clamping members for holding the tube firmly against the vulcanizing body. A further object of the invention is to provide improved adjustable locking devices for holding the clamping members in locked position with reference to the vulcanizing body.

Still further objects of the invention relate to details of construction and to combinations and arrangements of parts as hereinafter described and more particularly pointed out in the claims.

In the accompanying drawings, I have shown a preferred embodiment of the invention, but I wish it understood that the principle of the invention may find its application in machines constructed otherwise than as here represented, and I, therefore, do not wish to be limited to the special construction shown in the drawings, except as I may expressly designate such parts in certain claims to be hereinafter given as defining a preferred construction, and then only for the purpose of such claims.

In the accompanying drawings, Figure 1 is a view in front elevation of a machine constructed according to my invention, one of the clamping members being shown out of use.

Figure 2 is a sectional view on the line 2—2 of Figure 1 but showing in addition a clamped tube.

Figure 3 is a plan view of the machine.

Figure 4 is an end view thereof.

Figure 5 is a detached view on enlarged scale, showing one of the adjustable locking devices for a clamping member, and Figure 6 is a broken sectional view through one of the clamping members on an enlarged scale, showing the yielding pressure device of one of the clamping members.

Referring now to these drawings, the numeral 8 indicates a rectangular casing preferably constructed of wood and open at its top and bottom, and the numeral 9, a vulcanizing body of metal mounted therein. The vulcanizing body is in the form of a hollow chamber rectangular in shape and provided on its ends and sides with projecting ledges 10 which rest upon the sides and ends of the casing 8 at the top thereof. The vulcanizing body 9 is of less dimensions than the interior of the casing 8 so that when the former is supported in the latter, as shown particularly in Figure 2, a space 11 will be provided separating the vulcanizing body from the casing, which arrangement insulates the vulcanizing body from the said casing and minimizes as far as possible, radiation of heat from the vulcanizing body through the casing. The vulcanizing body provides a chamber 12 on its interior, adapted to contain water in its lower portion and providing in its upper portion a space for steam, which is generated by an electric heater 13 secured on the bottom of the vulcanizing body 9. The numeral 14 indicates a conductor leading from a temperature gauge 15 to the heater 13 and being connected to a thermostatic member in the gauge as usual. The numerals 16 and 17 indicate conductors leading respectively, from the heater 13 and gauge 15 to a plug or other source of electricity. The top 18 of the vulcanizing body provides on its upper side, the vulcanizing surface against which a tube 19 is adapted to be clamped by the means hereinafter described. Numeral 20 indicates a tube entering the vulcanizing chamber 12 through one side of the casing 8 and vulcanizing body 9 and having on its outer end a safety valve 21 which is adapted to relieve undue pressure of steam which may be generated in chamber 12.

I will now describe my improved means for clamping the tube on the vulcanizing body and for mounting said clamping means on the machine. Secured on either end of the casing 8 is a metal bar 22, Figure 4, each of which, as shown, is inclined downwardly from a point to the rear, and above the rear side, of the casing 8 to a point beyond and towards the bottom of the forward side of said casing. The upper ends of these bars are connected by a rod 23, Figures 2 and 3, and the lower ends by a similar rod 24, these parts constituting a clamp holder. Pivotally and slidably mounted on the rod 23 are a series of clamping arms 25, four of such arms being shown in the drawings. Loosely mounted in an enlargement 26 in the center of each of these arms, is a bolt 27, provided at its lower end with a head 28 and retained in the clamping arm by a nut 29 screwed on its upper end. Between the head 28 and under-side of the clamping arm 25, is a coil spring 30. The outer end of each of the clamping arms 25 is bifurcated, as indicated by 31 in Figure 5, and pivotally mounted in each of these bifurcations by means of a pivot bolt 32, is a metal block 33 which is screwthreaded towards its outer end to receive the upper screwthreaded end 34 of the rod 35, the lower end of which is bent to provide a hook 36. The construction described embodying the pressure members 27 and locking bars 35, is the same with each of the clamping arms 25. In Figures 1, 2, 3, and 4, one of these clamping bars is shown in a raised position to better illustrate the construction. Secured on the rear of the casing 8 and extending upwardly and rearwardly therefrom, is a bail 37 which, as shown in Figures 1 and 3, is substantially the length of the casing 8. The bail 37 serves as a support for the clamping arms 25 when they are turned out of position, as shown in the case of one arm in the first four figures, as a handle by means of which the vulcanizer as a whole may be carried, and, finally, as a support for a tube when only a small portion of it is clamped on the vulcanizer.

The numerals 38 and 39 indicate wooden blocks used in clamping the tube 19 against the vulcanizer. In operation, the patch having been applied to a tube, it is laid on the vulcanizer to extend longitudinally thereon, as shown by dotted lines in Figure 3, one or more blocks 38, 39 are placed on top of the tube and a corresponding number of the clamping arms 25 turned forwardly to bring the heads 28 of the bolts, or pressure members, in contact with said blocks, the outer ends of the bars being pressed forward against the resistance of the springs 30 and their hooked ends 36 passed under the bar 24. According to the size of the patch a shorter or a longer block, 38, 39 is employed, or two, or more, of either of such blocks may be employed and a requisite number of clamping arms used for clamping the blocks against the tube. The provision of the spring 30 between the clamping arm and the head 28 of each pressure member, provides a yielding contact which enables the block to accommodate itself to any inequalities of thickness in the tube. The degree of pressure exerted on each of the springs is regulated by screwing the rod 35 in or out of the block 33 a greater or less distance, the shorter the rod is made by screwing it up, the greater the pressure required to pass the hook 36 under the rod 24 and hence the greater pressure exerted upon the wooden block on the tube on which it bears.

Not only does my invention provide what I believe to be a novel, and have demonstrated to be a simple and highly efficient means of clamping a tube on a vulcanizer, but in addition, and a fact of possibly more importance than the construction, I so mount these clamping means, which are of metal, that they are wholly insulated from contact with the vulcanizing body and hence do not in any manner facilitate radiation of heat from such vulcanizing body. This is a highly important feature as, in actual practice, I have demonstrated with the present type of machine, a saving approximating forty per cent of the current which it has heretofore been necessary to use for a given operation with the prior types of machine of the same size, but in which the clamping members were not so insulated.

I claim—

1. In a vulcanizing machine, in combination with a casing substantially non-conductive of heat, a hollow vulcanizing body mounted in and supported by said casing and adapted to contain a fluid to be heated, a clamp holder mounted on said casing out of contact with said vulcanizing body, and clamping members for the article to be vulcanized mounted on said holder for clamping the article to be vulcanized against the surface of said vulcanizing body.

2. In a vulcanizing machine, in combination with a casing substantially non-conductive of heat, a vulcanizing body mounted in and supported by said casing, a clamp holder mounted on said casing out of contact with said vulcanizing body, and clamping members for the article to be vulcanized mounted on said holder and adapted to co-operate therewith in clamping the article to be vulcanized against the surface of said vulcanizing body.

3. In a vulcanizing machine, in combination with a casing substantially non-conductive of heat, a vulcanizing body mounted in and supported by said casing, a clamp holder mounted on said casing out of contact with said vulcanizing body, a clamping arm pivotally mounted on one member of said holder and having a yielding pressure device for pressing the article to be vulcanized against the surface of said vulcanizing body, and means carried by said clamping arm and adapted to engage another part of said holder for holding the clamping arm in clamped position with reference to the vulcanizing body.

4. In a vulcanizing machine, in combination with a supported vulcanizing body, a clamping arm pivotally mounted at one end in co-operative relation with said vulcanizing body, a pressure member carried by said clamping arm for pressing the article to be vulcanized against the surface of said vulcanizing body, a block pivotally mounted at the free end of said clamping arm, and means for locking the clamping arm in clamped position with reference to said vulcanizing body, comprising a latch member having adjustable screw-threaded connection at one end with said block and at its other end provided with means for engaging a fixed part of the machine.

5. In a vulcanizing machine, in combination with a casing, a vulcanizing body mounted therein, a clamp holder mounted on said casing affording two parallel bars located, respectively, at opposite sides of said casing, a clamping arm pivotally and slidably mounted at one end on one of said bars and having a bifurcated outer end, a block pivotally mounted in said bifurcated end, a latch member having adjustable screw-threaded connection with said block at one end and at its other provided with a hook for engaging under the other of said bars, and a pressure member mounted substantially centrally of the length of said clamping arm for exerting pressure upon the article to be vulcanized when the clamping arm is held in clamped position by means of said latch member.

6. In a vulcanizing machine, in combination with a casing, a vulcanizing body mounted therein, a clamp holder mounted on said casing affording two parallel bars located, respectively, at opposite sides of said casing, a clamping arm pivotally and slidably mounted at one end on one of said bars and having a bifurcated outer end, a block pivotally mounted in said bifurcated end, a latch member having adjustable screw-threaded connection with said block at one end and at its other provided with a hook for engaging under the other of said bars, and a yieldable pressure member mounted substantially centrally of the length of said clamping arm for exerting pressure upon the article to be vulcanized when the clamping arm is held in clamped position by means of said latch member.

In testimony whereof, I have hereunto set my hand.

WILLIAM A. GWYNN.